(12) United States Patent
Donabedian et al.

(10) Patent No.: US 7,354,101 B2
(45) Date of Patent: Apr. 8, 2008

(54) HOOD STRUCTURE WITH CRUSH INITIATORS

(75) Inventors: Edgar Edward Donabedian, Livonia, MI (US); Matthew B. Makowski, Dearborn, MI (US); Charles Ko, Novi, MI (US); Nordine Fellague, Windsor (CA); Shiv Grover, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 11/164,875

(22) Filed: Dec. 8, 2005

(65) Prior Publication Data

US 2007/0132279 A1 Jun. 14, 2007

(51) Int. Cl.
*B62D 25/10* (2006.01)
(52) U.S. Cl. .................. 296/193.11; 180/69.2
(58) Field of Classification Search ........... 296/187.09, 296/193.11; 180/69.2, 274
See application file for complete search history.

(56) References Cited

U.S. PATENT DOCUMENTS

| | | | |
|---|---|---|---|
| 3,794,348 A | 2/1974 | Fischer | |
| 4,194,763 A | 3/1980 | Reidelbach et al. | |
| 4,579,185 A | 4/1986 | Wakasa | |
| 4,872,417 A | 10/1989 | Kuwabara et al. | |
| 5,115,878 A | 5/1992 | Hayata | |
| 5,197,560 A * | 3/1993 | Oda et al. | 180/69.21 |
| 5,476,151 A * | 12/1995 | Tsuchida et al. | 180/274 |
| 5,605,371 A | 2/1997 | Brochelt et al. | |
| 6,048,022 A * | 4/2000 | Ishibashi et al. | 296/187.09 |
| 6,736,448 B2 | 5/2004 | Hanakawa et al. | |
| 6,786,531 B2 * | 9/2004 | Miyahara et al. | 296/146.1 |
| 6,938,715 B2 * | 9/2005 | Hamada et al. | 180/274 |
| 7,052,075 B2 * | 5/2006 | Kamada et al. | 296/187.01 |
| 7,090,289 B2 * | 8/2006 | Koura | 296/193.11 |
| 2006/0163915 A1 * | 7/2006 | Ikeda et al. | 296/193.11 |

FOREIGN PATENT DOCUMENTS

| | | | | |
|---|---|---|---|---|
| JP | 362085767 A * | 4/1987 | | 180/69.2 |
| JP | 404055175 A * | 2/1992 | | 180/69.2 |
| JP | 11255153 A * | 3/1998 | | |
| JP | 411208511 A * | 8/1999 | | |
| JP | 2006015812 A * | 1/2006 | | |
| JP | 2006044311 A * | 2/2006 | | |
| JP | 2006224876 A * | 8/2006 | | |

* cited by examiner

*Primary Examiner*—Jason S Morrow
(74) *Attorney, Agent, or Firm*—Gigette Bejin, Esq.; Dykema Gossett PLLC

(57) ABSTRACT

A vehicle hood for achieving generally predetermined deformation in an event of a front impact. The hood may include an outer panel including at least one raised section along rear and side edges of the hood for thereby defining a reverse power dome. An inner panel may be attached to the outer panel and include at least two laterally extending beams each of which extend substantially across a width of the hood respectively adjacent front and the rear edges. At least one crush initiator may be disposed adjacent each of the laterally extending beams for enabling generally predetermined deformation of the hood in the event of a front impact.

20 Claims, 5 Drawing Sheets

HOOD STRUCTURE WITH CRUSH INITIATORS

BACKGROUND OF INVENTION a. Field of Invention

The invention relates generally to vehicle structural design, and, more particularly, to a vehicle hood design for permitting generally predetermined hood deformation during a front impact event.

b. Description of Related Art

The front body of a vehicle generally includes a frame, a front bumper system, body panels, and a hood mounted to the body structure for allowing access to the engine compartment. During a front impact event, amongst other components, the front bumper system, body panels and hood are each designed to absorb a predetermined percentage of the impact, which is generally in direct correlation with the deformation characteristics of such components. Thus, the design of the front body plays an important role in the absorption and distribution of forces generated during a front impact event.

While hoods normally include a smooth upper (i.e. exposed) surface, some existing hood designs include a variety of contours on the visible hood side for primarily providing a desired aesthetic appearance. Such contours are generally provided on a hood outer panel which is welded or otherwise attached to an inner panel including a variety of structural beams for allowing predetermined hood deformation, as well as for providing stiffness to the hood structure. Such contours on the outer panel however also affect the hood deformation characteristics during a front impact event.

For example, referring to FIG. 1 (a), an exemplary hood design is illustrated and includes a hood 10 having an outer panel 12. As can be seen in FIG. 1(a), the outer panel includes a generally smooth outer surface. However, referring to FIG. 2(a), as discussed in detail below, a hood design according to the present invention includes a pair of raised longitudinal sections 14 equally spaced from the centerline of the vehicle (not shown). The raised sections each intersect with an equally raised section 16 that runs along the rear (lateral) edge 18 of the hood. This design creates a "reverse power dome" in center portion 20 of the outer panel, thus providing the hood with a desirable aesthetic appearance.

As shown in FIG. 1 (b), in order to prevent hood windshield intrusion during a front impact event, for the hood structure of FIG. 1 (a) which includes a smooth outer panel surface, it is known to provide a single set of crush initiators 22 (or a single crush initiator 22 as shown in FIG. 1(a)) on inner panel 24 generally centrally along the hood longitudinal direction. During a front impact event, this type of hood structure results in "A" shaped deformation of the hood (when viewed from the side of the deformed hood), which for conventional hood designs such as the design of FIG. 1(a), provides acceptable deformation characteristics. However, for a hood which includes the reverse power dome feature of FIG. 2(a), as well as other similar contours on the hood outer panel, during a front impact, the raised sections 14 and 16 may act as beams to potentially intrude into a windshield during the front impact event. Moreover, the reverse power dome feature has a natural tendency to buckle in a downward direction toward the vehicle engine (not shown), which is also undesirable.

It would therefore be of benefit to provide a vehicle hood structure which allows for the inclusion of a variety of contours on the hood outer panel, such as the noted reverse power dome feature, without affecting the deformation characteristics of the hood. It would also be of benefit to provide a hood structure capable of predetermined deformation during a front impact event, with the hood structure meeting existing automotive hood deformation requirements, without significantly increasing the design, tooling and manufacturing costs for such structural components.

SUMMARY OF INVENTION

The invention solves the problems and overcomes the drawbacks and deficiencies of prior art vehicle hood structure designs by providing a hood structure which is capable of predetermined deformation, generally regardless of the type of contours placed on the exterior hood panel.

Thus an exemplary aspect of the present invention is to provide a hood structure which is capable of hood deformation without intrusion into a vehicle windshield area.

Another exemplary aspect of the present invention is to provide a hood structure which meets or exceeds existing frontal impact hood deformation requirements.

The invention achieves the aforementioned exemplary aspects by providing a vehicle hood for achieving generally predetermined deformation in an event of a front impact. The hood may include an outer panel including at least one raised section along rear and side edges of the hood for thereby defining a reverse power dome. An inner panel may be attached to the outer panel and include at least two laterally extending beams each of which extend substantially across a width of the hood respectively adjacent front and the rear edges. At least one crush initiator may be disposed adjacent each of the laterally extending beams for enabling generally predetermined deformation of the hood in the event of a front impact.

For the vehicle hood described above, the reverse power dome may be formed by a raised lateral section provided adjacent the rear edge and a pair of raised longitudinal sections each respectively provided adjacent the side edges of the hood. The inner panel may further include at least one longitudinally extending beam disposed between the crush initiators adjacent the side edges of the hood. Further, the inner panel may include at least one laterally extending beam disposed between the crush initiators, generally centrally on the inner panel. The laterally extending beam may include tapered edges, and may also include hood mastic adhesive applied to the tapered edges for adding stiffness to the hood. At least one of the crush initiators may extend substantially across the width of the hood, and may include a concave profile. The vehicle hood may also include at least one transversely extending beam disposed adjacent at least one of the crush initiators for providing stiffness to the hood.

The invention also provides a vehicle hood for achieving generally predetermined deformation in an event of a front impact. The hood may include an outer panel, and an inner panel attached to the outer panel and including at least two laterally extending beams each of which extend at least partially across a width of the hood respectively adjacent front and rear edges of the hood. At least one crush initiator may be disposed adjacent each of the laterally extending beams for enabling generally predetermined deformation of the hood in the event of a front impact.

For the vehicle hood described above, the outer panel may include at least one raised section along side edges and the rear edge of the hood for thereby defining a reverse power dome. The reverse power dome may be formed by a raised lateral section provided adjacent the rear edge and a pair of raised longitudinal sections each respectively provided adjacent the side edges of the hood. The inner panel may further include at least one longitudinally extending beam disposed between the crush initiators adjacent side edges of the hood. Further, the inner panel may include at least one laterally extending beam disposed between the crush initiators, generally centrally on the inner panel. The laterally extending beam may include tapered edges, and hood mastic adhesive may be applied to the tapered edges for adding stiffness to the hood. At least one of the crush initiators may extend substantially across the width of the hood, and include a concave profile. The vehicle hood may further include at least one transversely extending beam disposed adjacent at least one of the crush initiators for providing stiffness to the hood.

The invention yet further provides a vehicle including a hood for achieving generally predetermined deformation in an event of a front impact. The hood may include an outer panel, and an inner panel attached to the outer panel and including at least two laterally extending beams each of which extend at least partially across a width of the hood respectively adjacent front and rear edges of the hood. At least one crush initiator may be disposed adjacent each of the laterally extending beams for enabling generally predetermined deformation of the hood in the event of a front impact.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1A:
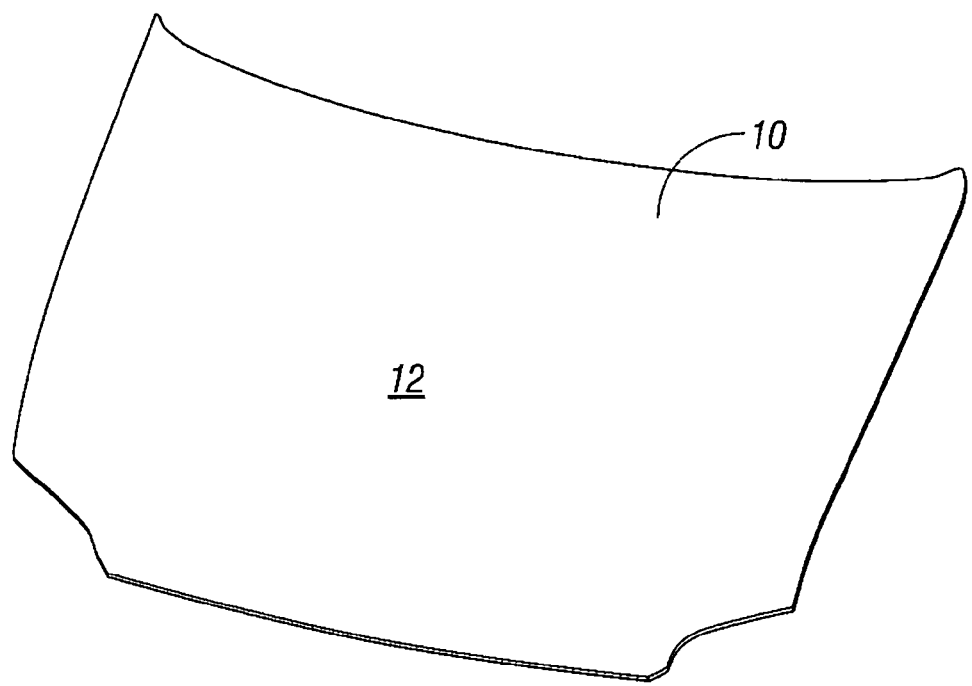
FIG. 1(a) is an isometric view of a related-art hood structure design, including a generally smooth hood outer panel.
Figure 1B:
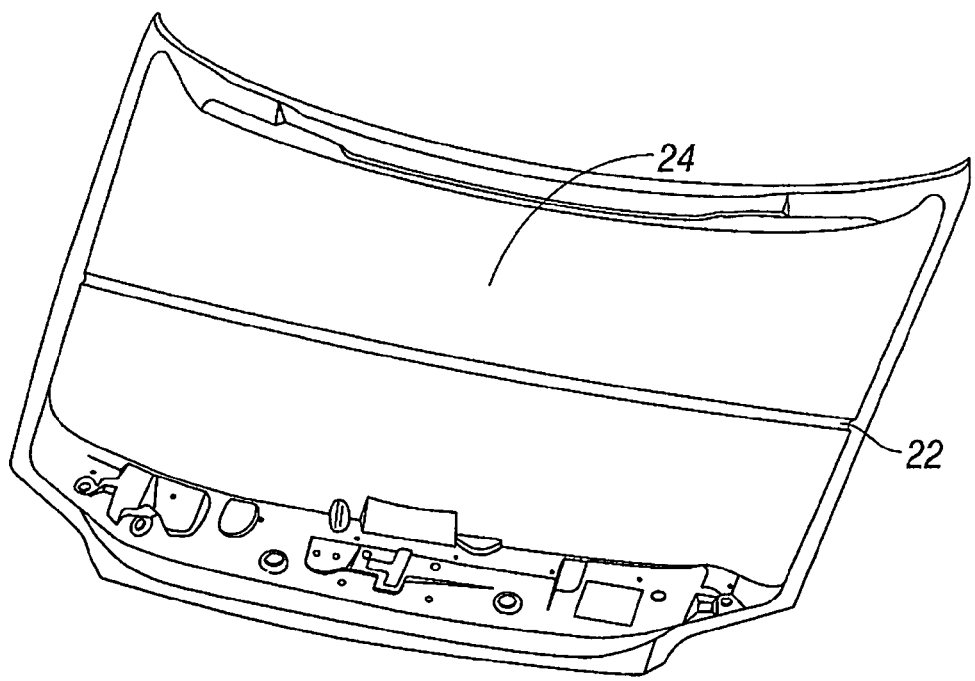
FIG. 1(b) is a bottom view of the hood structure of FIG. 1(a)

Referring now to the drawings wherein like reference numerals designate corresponding parts throughout the several views, FIGS. 2-7 illustrate a hood structure design according to the present invention, generally designated "hood structure 100."

Referring to FIGS. 2-6, hood structure 100 may generally include an outer panel 101 including a front edge 102, a rear edge 104 and longitudinal edges 106, 108. Front edge 102 may be deflected downward as shown for providing an aerodynamic fit with the front grill (not shown) of a vehicle having hood 100 mounted thereon. Longitudinal edges 106, 108 may each respectively include raised longitudinal sections 110, 112 which intersect with raised lateral section 114 provided adjacent rear edge 104. In this manner, the area between sections 110, 112 and 114 may form a reverse power dome for providing a desired aesthetic outer appearance of the hood. While in the embodiment illustrated, the area between sections 110, 112 and 114 is illustrated as being generally coplanar with longitudinal edges 106, 108, it should be noted that this area may be likewise formed at a higher or lower elevation to edges 106, 108 to essentially form a structure on the outer panel which affects the hood deformation characteristics.

Figure 2A:
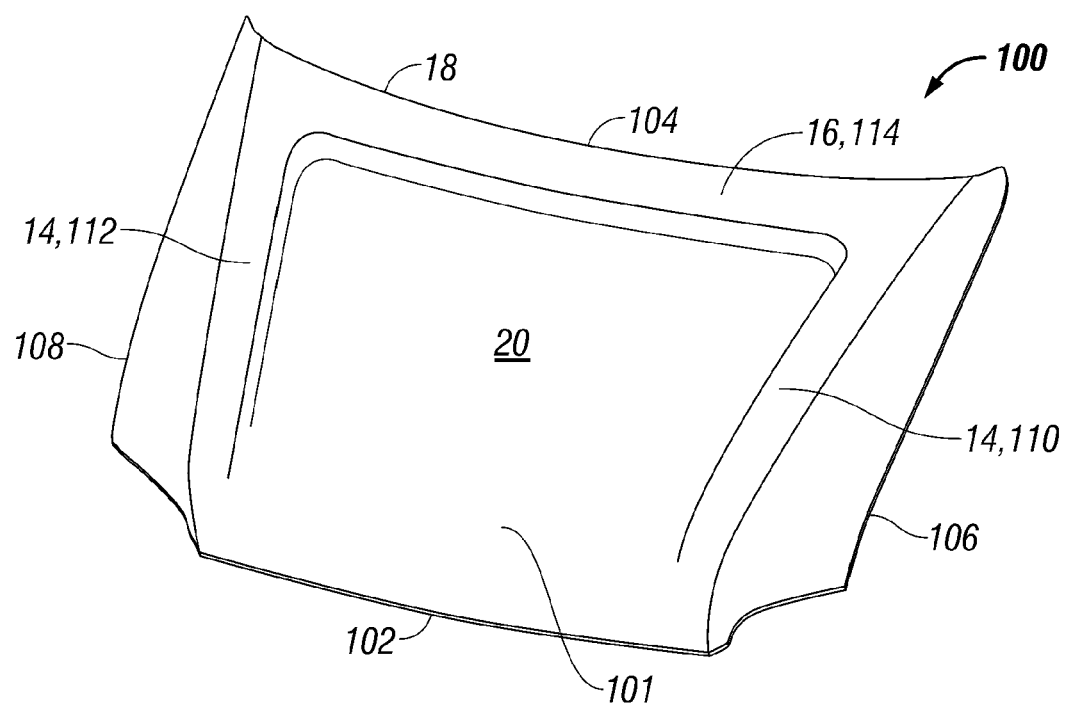
FIG. 2(a) is an isometric view of a hood structure design according to the present invention, illustrating a hood outer panel.
Figure 2B:
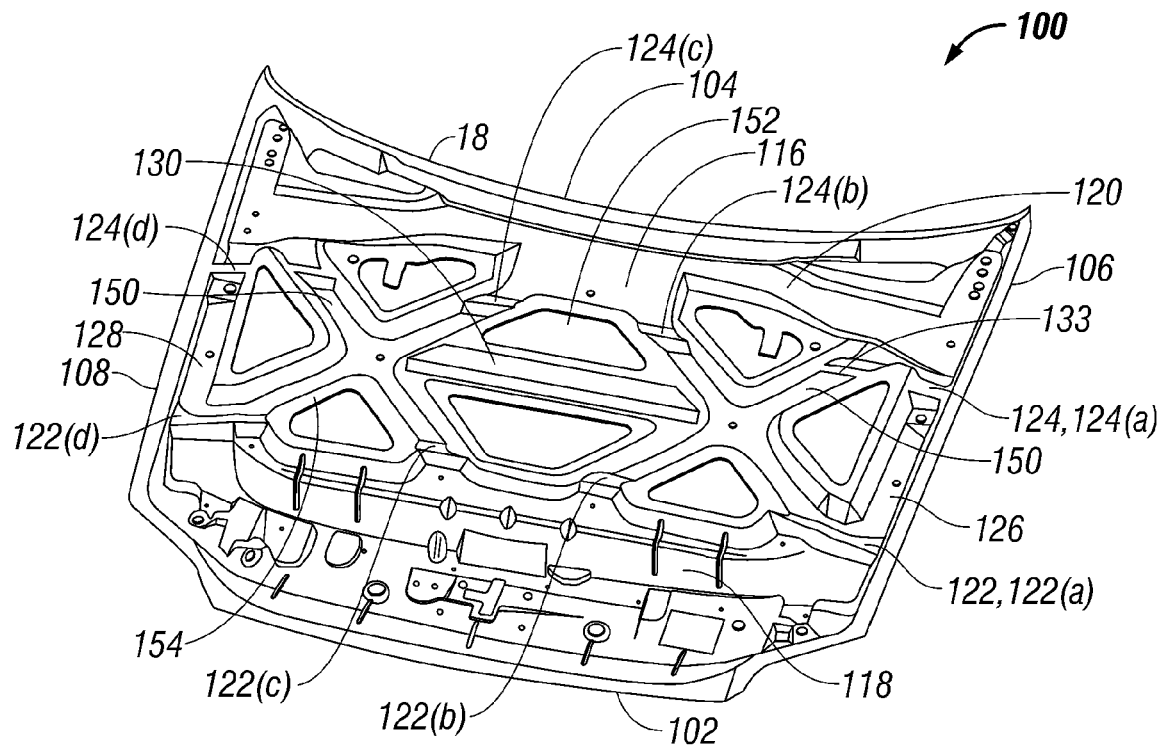
FIG. 2(b) is an isometric view of a hood structure design according to the present invention, illustrating a hood inner panel.
Figure 3:
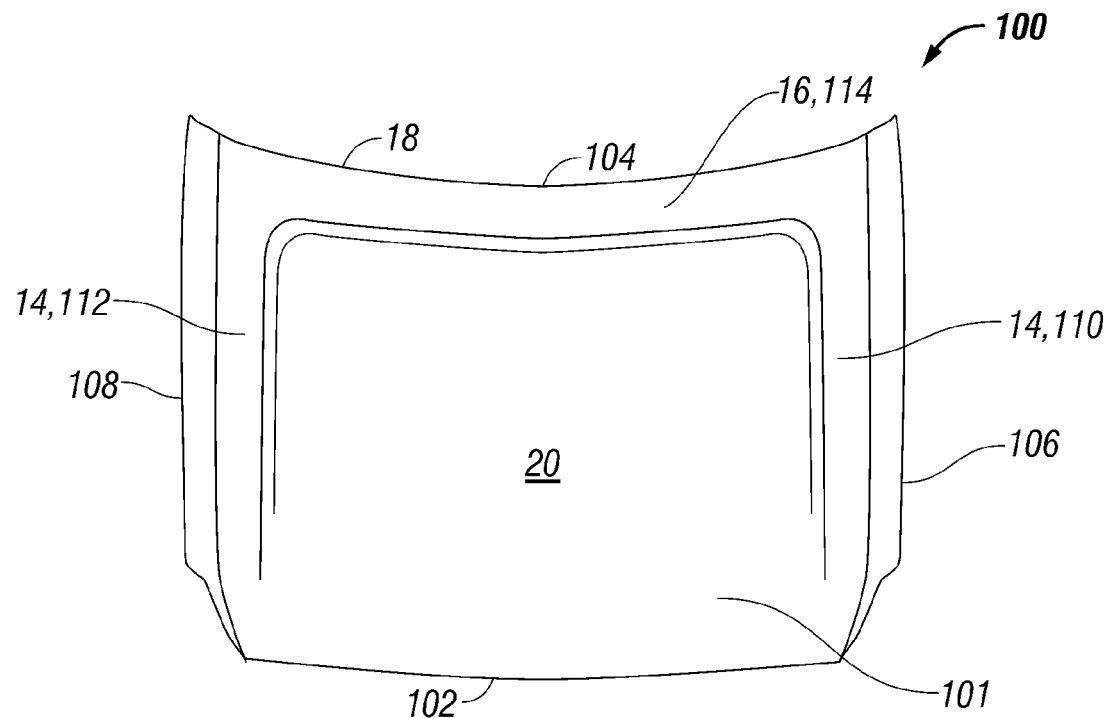
FIG. 3 is a top view of the hood structure design of FIG. 2(a)
Figure 4:
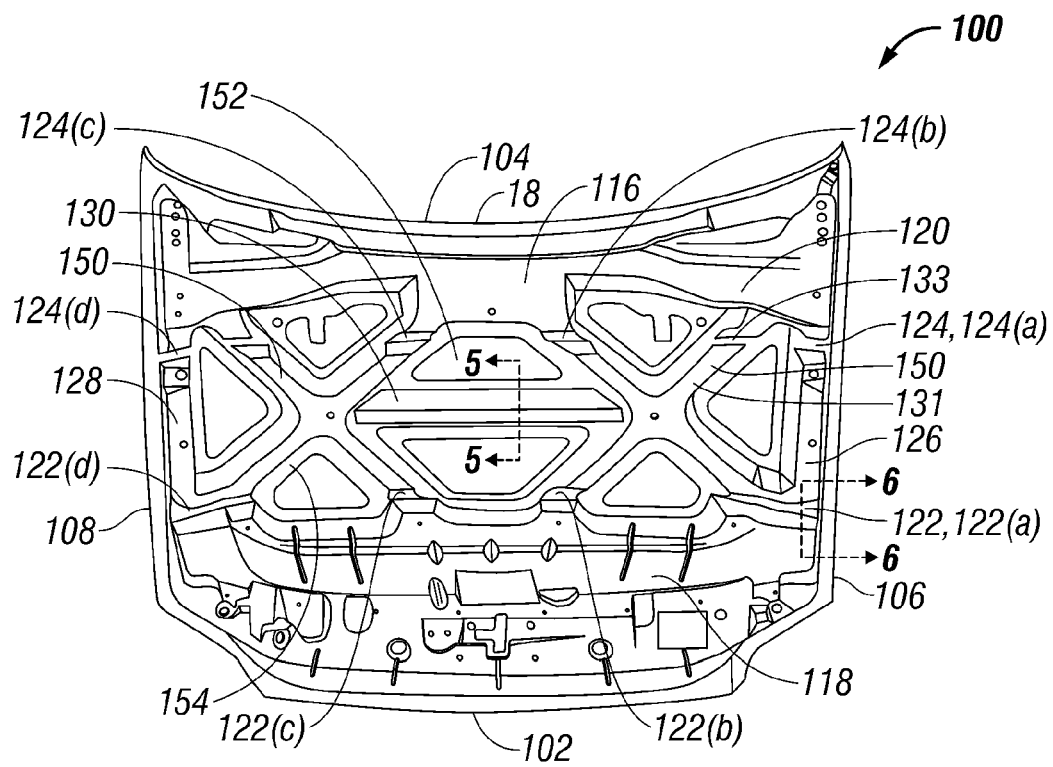
FIG. 4 is a bottom view of the hood structure design of FIG. 2(a)

Referring next to FIGS. 2(b) and 4, hood 100 may include an inner panel 116 attached to outer panel 101, with the inner panel including a front beam 118 substantially spanning the entire width of the hood for providing rigidity to the hood structure. Beam 118 may be disposed adjacent front edge 102. Likewise, a rear beam 120 may be provided adjacent rear edge 104 and substantially span the entire width of the hood. The structure of inner panel 116, as well as front and rear beams 118 and 120, respectively, may be contoured as shown for providing access to various components (i.e. latches, hinges etc.) for hood operation. Further, beams 118, 120 may be formed to include a substantially rectangular cross-section, and may be formed by stamping inner panel 116 or otherwise forming panel 116 as is known in the art.

Figure 6:
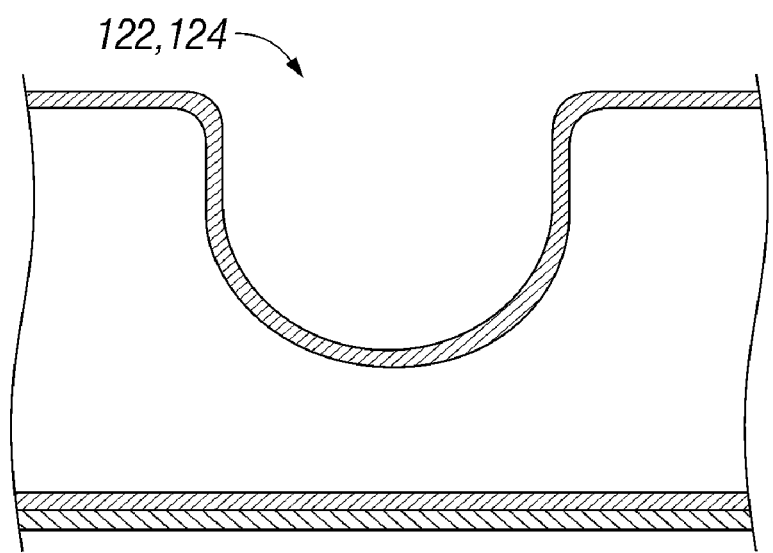
FIG. 6 is a cross-sectional view of an exemplary crush initiator for the hood structure design of FIG. 2(a), taken substantially along line 6-6 in FIG. 3.

Referring to FIGS. 2(b) and 4, beams 118 and 120 may each respectively include adjacently disposed sets of crush initiators 122, 124, which as shown in FIG. 6, may include a concave profile in the direction of outer panel 101. As shown in FIGS. 2(b) and 4, crush initiator 122 may be disposed adjacent beam 118 on the side opposite to edge 102 (i.e. behind beam 118 in the forward to aft vehicle direction) for assisting with the management of energy transfer during a front impact event. Likewise, crush initiator 124 may be disposed adjacent beam 120 on the side opposite to edge 104 (i.e. in front of beam 120 in the forward to aft vehicle direction), for achieving proper buckling of the hood structure. In this manner, crush initiators 122, 124 may provide for predetermined deformation of hood structure 100, as discussed in detail below. As illustrated, crush initiators 122, 124 may generally span the entire lateral width of hood structure 100, or alternatively, crush initiators 122, 124 may only be formed adjacent the longitudinal edges 106, 108 of the hood. For example, for the embodiment illustrated, crush initiator 122 may include sub-section 122(a)-(d), and likewise, crush initiator 124 may include sub-sections 124(a)-(d), for facilitating uniform predetermined deformation of hood structure 100, as discussed in detail below.

Hood structure 100 may further include mirror-image longitudinal beams 126, 128 disposed between crush initiators 122, 124. Beams 126, 128 may be provided for maintaining hood structure 100 in a predetermined configuration during a front impact event, as also discussed in detail below. Beams 126, 128 may be formed of a similar cross-section and in a similar manner as beams 118, 120.

Figure 5:
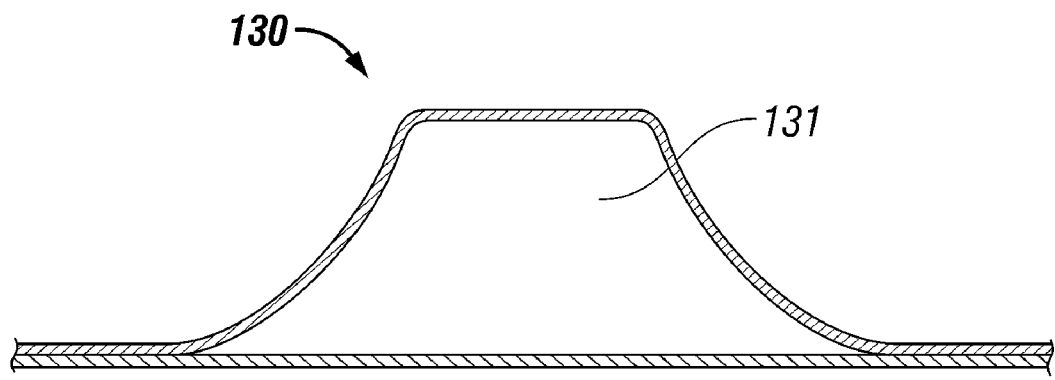
FIG. 5 is a cross-sectional view of an exemplary structural beam for the hood structure design of FIG. 2(a), taken substantially along line 5-5 in FIG. 3.

Still referring to FIGS. 2(*b*) and 4, in order to provide for lateral structural rigidity, as well as for preventing windshield intrusion during a front impact event, a lateral hood beam 130 may be provided generally centrally between crush initiators 122, 124. As shown in FIG. 5, beam 130 may include a tapered cross-section for further strengthening the structure of beam 130, as well as for reducing the overall weight of hood structure 100.

Figure 7:
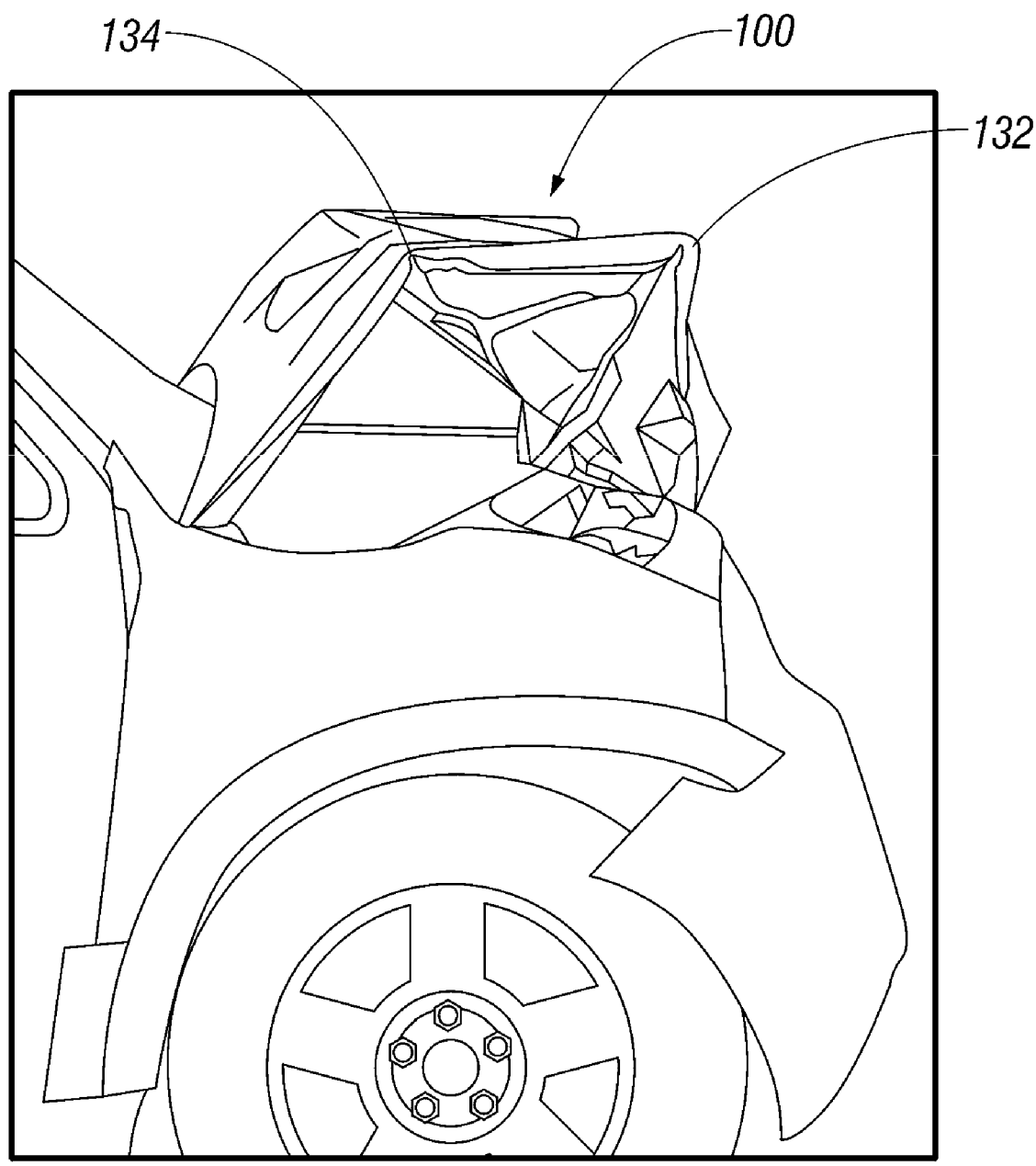
FIG. 7 is a view illustrating the exemplary deformation characteristics of the hood structure design of FIG. 2(a), as a result of a front impact event.

Referring next to FIG. 7, in the event of a front impact event, hood structure 100 may deform as shown in FIG. 7 such that crush initiators 122, 124 and beams 126, 128 (as well as beams 118, 120 and 130) act in concert to produce a generally inverted U-shaped hood deformation. As shown in FIG. 7, upon hood deformation, crush initiators 122, 124 may allow for deformation of the hood at edges 132, 134, with longitudinal beams 126, 128 providing the reinforcement between the crush initiators for maintaining the hood in the inverted U-shaped configuration illustrated. Yet further, as shown in FIG. 7, lateral beams 118, 120 may likewise maintain the front and rear edges 102, 104, respectively, in a generally width-wise expanded configuration without allowing the hood from significantly collapsing in the lateral direction. Additionally, as shown in FIG. 7, lateral hood beam 130 may also maintain the hood structure in a width-wise expanded configuration while preventing intrusion of the hood structure into the windshield area, as may be the case for hood structures including longitudinal beams in the location of beam 130.

Based on the discussion above, hood structure 100 thus provides for predetermined deformation of the hood, generally regardless of the type of contours placed on the outer hood panel. Yet further, hood structure 100 provides for predetermined deformation, without intrusion thereof into the windshield area, while meeting or exceeding existing frontal impact hood deformation characteristics.

Referring next to FIGS. 2(*b*), 4 and 5, in another embodiment of the present invention, hood structure 100 may optionally include a plurality of asymmetrically disposed transverse beams 150 for providing additional rigidity to the structure of the hood. Beams 150 may be formed in a similar cross-sectional configuration as lateral hood beam 130. Based on the layout illustrated in FIGS. 2(*b*) and 4, beams 150 may thus provide for lateral as well as longitudinal rigidity to the structure of the hood. Yet further, based on the tapered cross-sections of beam 150 (as well as beam 130), the structure of the hood may deform in a predetermined manner as shown in FIG. 7. Moreover, gaps 152 between the various lateral and longitudinal beams may be provided for reducing the overall weight of the hood structure. As shown in FIG. 2(*b*), beams 150 may also create an asymmetrical loading condition that allows the deeper sections 131 to be used for providing rigidity (i.e. torsional, deflection etc.) to the hood structure, with the beams then tapering to a reduced depth at area 133 that terminates toward crush initiators 122, 124.

Referring also to FIGS. 2(*b*), 4 and 5, in a yet further embodiment of the present invention, the structure of the hood may be optionally provided with hood mastic adhesive 154 along the tapered edges of beams 130, 150 for providing additional rigidity to the structure of the beams. The use of hood mastic adhesive 154 thus allows for stiffening of the hood without increasing the weight thereof with the use of structural rigidifying members, and while also allowing for the use of tapered beam members.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle hood for achieving generally predetermined deformation in an event of a front impact, said hood comprising:
    an outer panel including at least one raised section along rear and side edges of said hood for thereby defining a reverse power dome;
    an inner panel attached to said outer panel and including at least two laterally extending beams each of which extend substantially across a width of said hood respectively adjacent front and said rear edges; and
    at least two crush initiators, a first and a second one of said crush initiators respectively disposed adjacent a first and a second one of said laterally extending beams for enabling the generally predetermined deformation of said hood in the event of a front impact.

2. A hood according to claim 1, wherein said reverse power dome is formed by a raised lateral section provided adjacent said rear edge and a pair of raised longitudinal sections each respectively provided adjacent said side edges of said hood.

3. A hood according to claim 1, wherein said inner panel further includes at least one longitudinally extending beam disposed between said crush initiators adjacent said side edges of said hood.

4. A hood according to claim 1, wherein said inner panel further includes at least one laterally extending beam disposed between said crush initiators, generally centrally on said inner panel.

5. A hood according to claim 4, wherein said laterally extending beam includes tapered edges.

6. A hood according to claim 5, further comprising hood mastic adhesive applied to said tapered edges for adding stiffness to said hood.

7. A hood according to claim 1, wherein at least one of said crush initiators extends substantially across said width of said hood.

8. A hood according to claim 1, wherein at least one of said crush initiators includes a concave profile.

9. A hood according to claim 1, further comprising at least one transversely extending beam disposed adjacent at least one of said crush initiators for providing stiffness to said hood.

10. A vehicle hood for achieving generally predetermined deformation in an event of a front impact, said hood comprising:
    an outer panel;
    an inner panel attached to said outer panel and including at least two laterally extending beams each of which extend at least partially across a width of said hood respectively adjacent front and rear edges of said hood; and
    at least two crush initiators, a first and a second one of said crush initiators respectively disposed between and adjacent a first and a second one of said laterally extending beams for enabling the generally predetermined deformation of said hood in the event of a front impact.

11. A hood according to claim 10, wherein said outer panel includes at least one raised section along side edges and said rear edge of said hood for thereby defining a reverse power dome.

12. A hood according to claim 11, wherein said reverse power dome is formed by a raised lateral section provided adjacent said rear edge and a pair of raised longitudinal sections each respectively provided adjacent said side edges of said hood.

13. A hood according to claim 10, wherein said inner panel further includes at least one longitudinally extending beam disposed between said crush initiators adjacent side edges of said hood.

14. A hood according to claim 10, wherein said inner panel further includes at least one laterally extending beam disposed between said crush initiators, generally centrally on said inner panel.

15. A hood according to claim 14, wherein said laterally extending beam includes tapered edges.

16. A hood according to claim 15, further comprising hood mastic adhesive applied to said tapered edges for adding stiffness to said hood.

17. A hood according to claim 10, wherein at least one of said crush initiators extends substantially across said width of said hood.

18. A hood according to claim 10, wherein at least one of said crush initiators includes a concave profile.

19. A hood according to claim 10, further comprising at least one transversely extending beam disposed adjacent at least one of said crush initiators for providing stiffness to said hood.

20. A vehicle including a hood for achieving generally predetermined deformation in an event of a front impact, said hood comprising:

an outer panel;

an inner panel attached to said outer panel and including at least two laterally extending beams each of which extend at least partially across a width of said hood respectively adjacent front and rear edges of said hood; and at least two crush initiators, a first and a second one of said crush initiators respectively disposed between and adjacent a first and a second one of said laterally extending beams for enabling the generally predetermined deformation of said hood in the event of a front impact.

* * * * *